(12) United States Patent
Strong et al.

(10) Patent No.: US 10,773,620 B2
(45) Date of Patent: Sep. 15, 2020

(54) SEAT COVER

(71) Applicant: HOPKINS MANUFACTURING CORPORATION, Emporia, KS (US)

(72) Inventors: Lynn Curtis Strong, Auburn, KS (US); Vicki Sickler, Emporia, KS (US)

(73) Assignee: Hopkins Manufacturing Corporation, Emporia, KS (US)

( * ) Notice: Subject to any disclaimer, the term of this patent is extended or adjusted under 35 U.S.C. 154(b) by 0 days.

(21) Appl. No.: 16/354,272

(22) Filed: Mar. 15, 2019

(65) Prior Publication Data

US 2019/0283637 A1 Sep. 19, 2019

Related U.S. Application Data

(60) Provisional application No. 62/644,092, filed on Mar. 16, 2018.

(51) Int. Cl.
*B60N 2/60* (2006.01)
(52) U.S. Cl.
CPC ............... *B60N 2/6027* (2013.01)
(58) Field of Classification Search
CPC ... B60N 2/6027; B60N 2/6045; B60N 2/6054
See application file for complete search history.

(56) References Cited

U.S. PATENT DOCUMENTS

| 4,396,227 | A | * | 8/1983 | Neilson | .................. | B60N 2/609 |
| | | | | | | 297/228.11 |
| 4,693,511 | A | | 9/1987 | Seltzer et al. | | |
| 8,128,166 | B2 | * | 3/2012 | Hoshina | ................. | B60N 2/585 |
| | | | | | | 297/218.3 |
| 8,328,279 | B2 | * | 12/2012 | Brncick | ............... | B60N 2/5816 |
| | | | | | | 297/228.11 |
| 8,936,313 | B2 | * | 1/2015 | Skarvan | ..................... | B62J 1/20 |
| | | | | | | 297/219.11 |
| 2009/0029520 | A1 | | 1/2009 | Chang et al. | | |
| 2013/0032072 | A1 | | 2/2013 | Dupont et al. | | |
| 2013/0320721 | A1 | * | 12/2013 | Cortellazzi | .......... | B60N 2/6063 |
| | | | | | | 297/224 |

FOREIGN PATENT DOCUMENTS

CN 206528382 9/2017

OTHER PUBLICATIONS

International Search Report and Written Opinion for PCT Appln. No. PCT/US2019/022419; Intl. Filing Date Mar. 15, 2019 and all references cited therein.

* cited by examiner

*Primary Examiner* — Philip F Gabler
(74) *Attorney, Agent, or Firm* — Hovey Williams LLP

(57) ABSTRACT

A seat cover comprises a seat bottom overlay configured to cover a seat bottom of a seat; a seat back overlay configured to cover a seat back of the seat; and an anchor system the keeps the seat bottom and back overlays in position on the seat. The anchor system comprises a rigid anchor; a drawstring sleeve on the seat bottom overlay or the seat back overlay; and a drawstring connected to the anchor and passing through the drawstring sleeve. When tightened, the drawstring urges the anchor against a rear of the seat to help hold the seat bottom overlay and seat back overlay in place on the seat.

18 Claims, 5 Drawing Sheets

SEAT COVER

RELATED APPLICATION

The present application is a non-provisional patent application and claims priority benefit, with regard to all common subject matter, of earlier-filed U.S. provisional patent application titled "SEAT COVER", Ser. No. 62/644,092, filed on Mar. 16, 2018, incorporated by reference in its entirety into the present application.

BACKGROUND

Vehicle seat covers are often used for protecting vehicle seats, personalizing vehicle interiors, and enhancing driver and passenger comfort. Conventional seat covers typically include a seat bottom overlay, a seat back overlay, and a "gap flap" that keeps the overlays in place on the seat. A typical gap flap includes an enlarged foam insert configured to be slid through the gap between a seat bottom and a seat back. The foam insert is intended to keep the seat cover in place by preventing the gap flap from being pulled back through the seat gap, but it provides little resistance and thus often fails to do so. The gap flap is also often too short or too long, resulting in the foam insert not being fully anchored behind the seat or not being snug against the back of the seat.

Some seat covers also include a drawstring for pulling a perimeter of the seat overlays against a seat to hold the seat cover in place. The drawstring is typically held in a drawn configuration via a small cam lock that can't withstand much force and that is difficult to operate.

SUMMARY

The present invention solves the above-described problems and other related problems by providing a seat cover that can be more effectively anchored to a vehicle seat or other seat. An embodiment of the seat cover broadly comprises a seat bottom overlay configured to cover a seat bottom of a seat; a seat back overlay configured to cover a seat back of the seat; and an anchor system the keeps the seat bottom and back overlays in position on the seat. An embodiment of the anchor system comprises a rigid anchor configured to be positioned behind the seat; a drawstring sleeve on the seat bottom overlay or the seat back overlay; and a drawstring connected to the anchor and passing through the drawstring sleeve. When the drawstring is tightened, it urges the anchor against a rear of the seat to help hold the seat bottom overlay and seat back overlay in place on the seat. The size and structure of the anchor keeps it from being pulled back through the seat gap.

BRIEF DESCRIPTION OF THE DRAWING FIGURES

Embodiments of the present invention are described in detail below with reference to the attached drawing figures, wherein.

Figure 1:
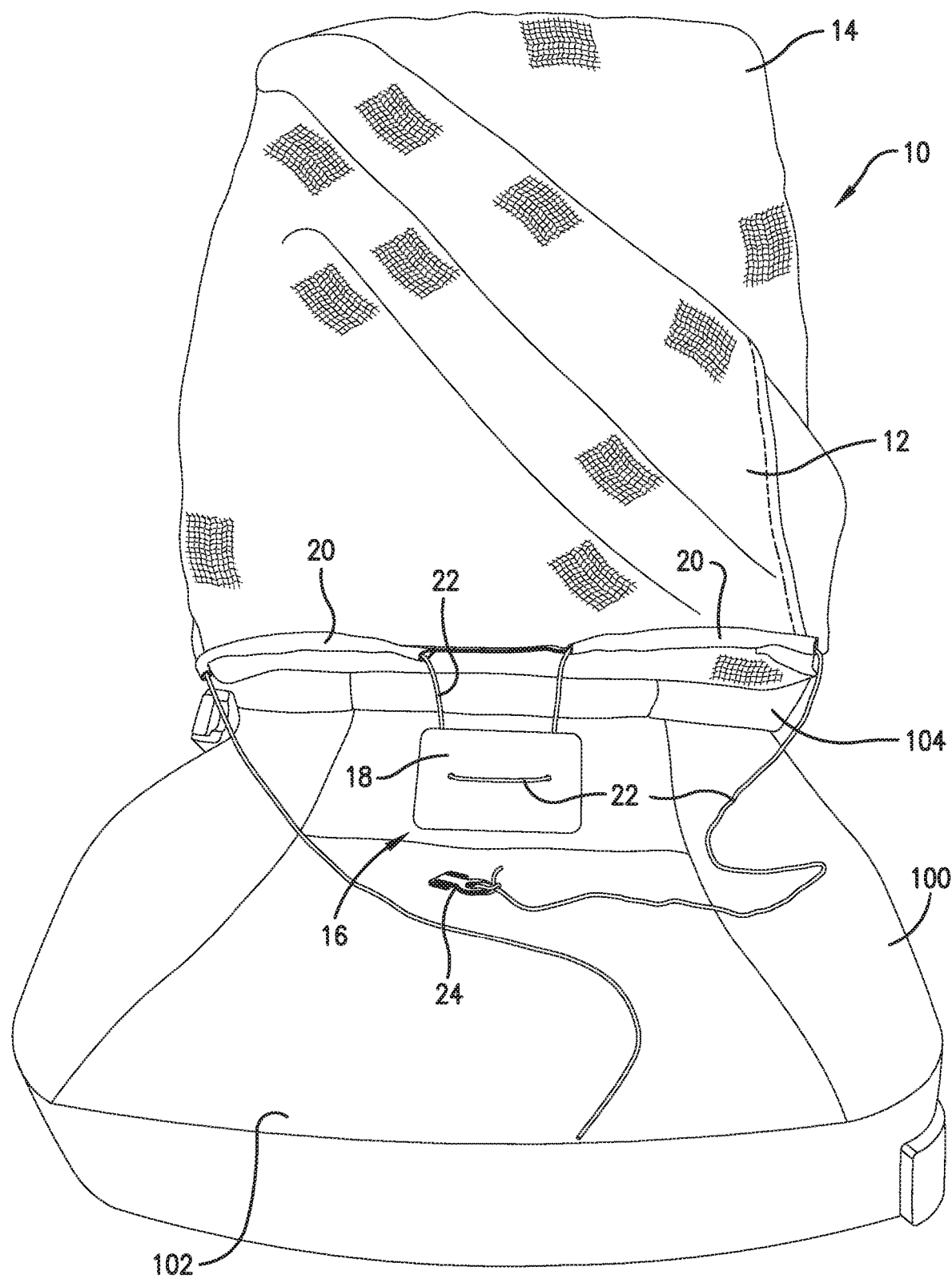
FIG. 1 is a front perspective view of a seat cover constructed in accordance with an embodiment of the invention and shown partially installed on a vehicle seat.
Figure 2:
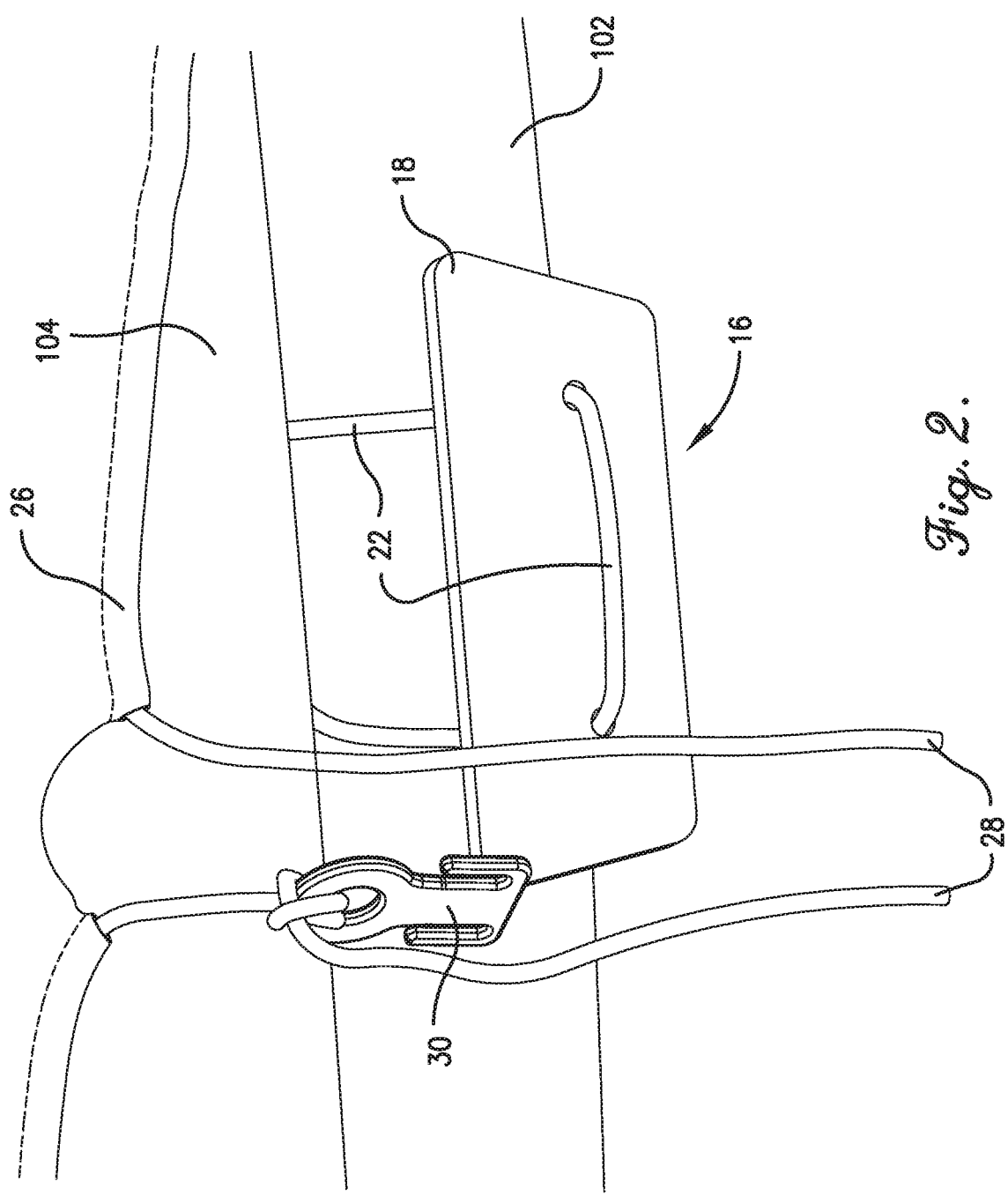
FIG. 2 is an enlarged view of an anchor system of the seat cover.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Figure 4:
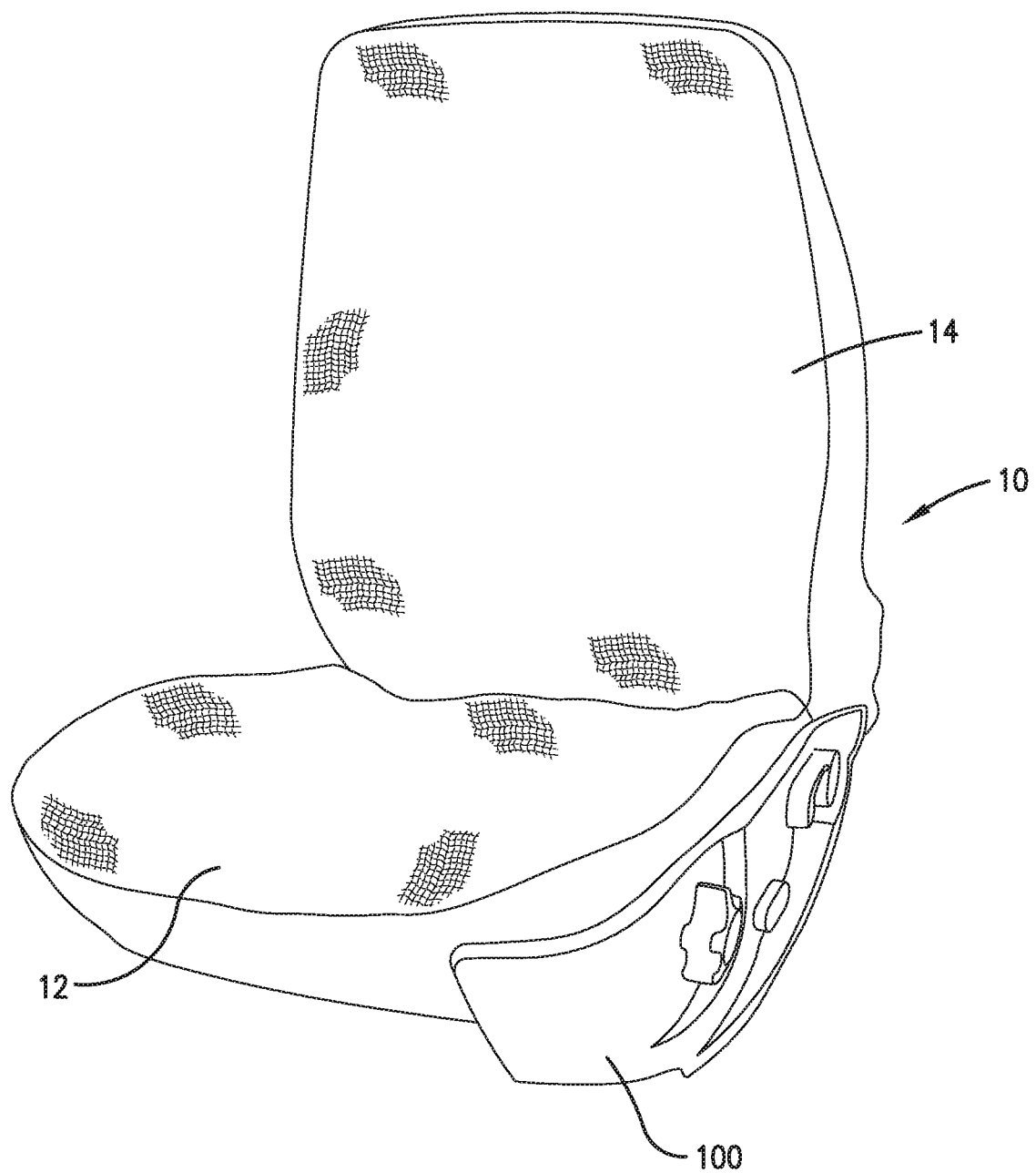
FIG. 4 is a front perspective view of the seat cover in a seat covering position.

Turning to the drawing figures, and initially FIGS. 1 and 4, a seat cover 10 constructed in accordance with an embodiment of the invention is shown on a vehicle seat 100. Other embodiments of the seat cover 10 may be designed to cover a chair, a couch, or any object on which a person may sit. The seat cover 10 broadly comprises a seat bottom overlay 12, a seat back overlay 14, and an anchor system 16.

The seat bottom overlay 12 is configured to be placed over and to at least partially cover a seat bottom 102 of the vehicle seat 100. It may be formed of woven fabric, vinyl, or other suitable pliable material and may be at least partially shaped to approximate the shape of the seat bottom 102. For example, the seat bottom overlay 12 may be pre-stretched or may have geometry that matches the contour of a bucket seat. The seat bottom overlay 12 may also have stylistic designs, logos, prints, patterns, and other aesthetic features.

The seat back overlay 14 is configured to be placed over and to at least partially cover a seat back 104 of the vehicle seat 100. It may also be formed of woven fabric, vinyl, or other suitable pliable material any may be at least partially shaped to approximate the shape of the seat back 104. For example, the seat back overlay 14 may be pre-stretched or may have geometry that matches the contour of a bucket seat. The seat back overlay 14 may also have stylistic designs, logos, prints, patterns, and other aesthetic features. The seat back overlay 14 and the seat bottom overlay 12 may be formed of separate pieces of material or a single piece of material. In the former case, the seat back overlay 14 and seat bottom overlay 12 may be attached to each other via a zipper, buttons, clasps, or other fasteners.

The anchor system 16 retains the seat bottom overlay 12 and seat back overlay 14 in a seat covering position and broadly comprises an anchor 18; a first drawstring sleeve 20; a first drawstring 22; a first drawstring catch 24; a second drawstring sleeve 26; a second drawstring 28; and a second drawstring catch 30.

Figure 3:
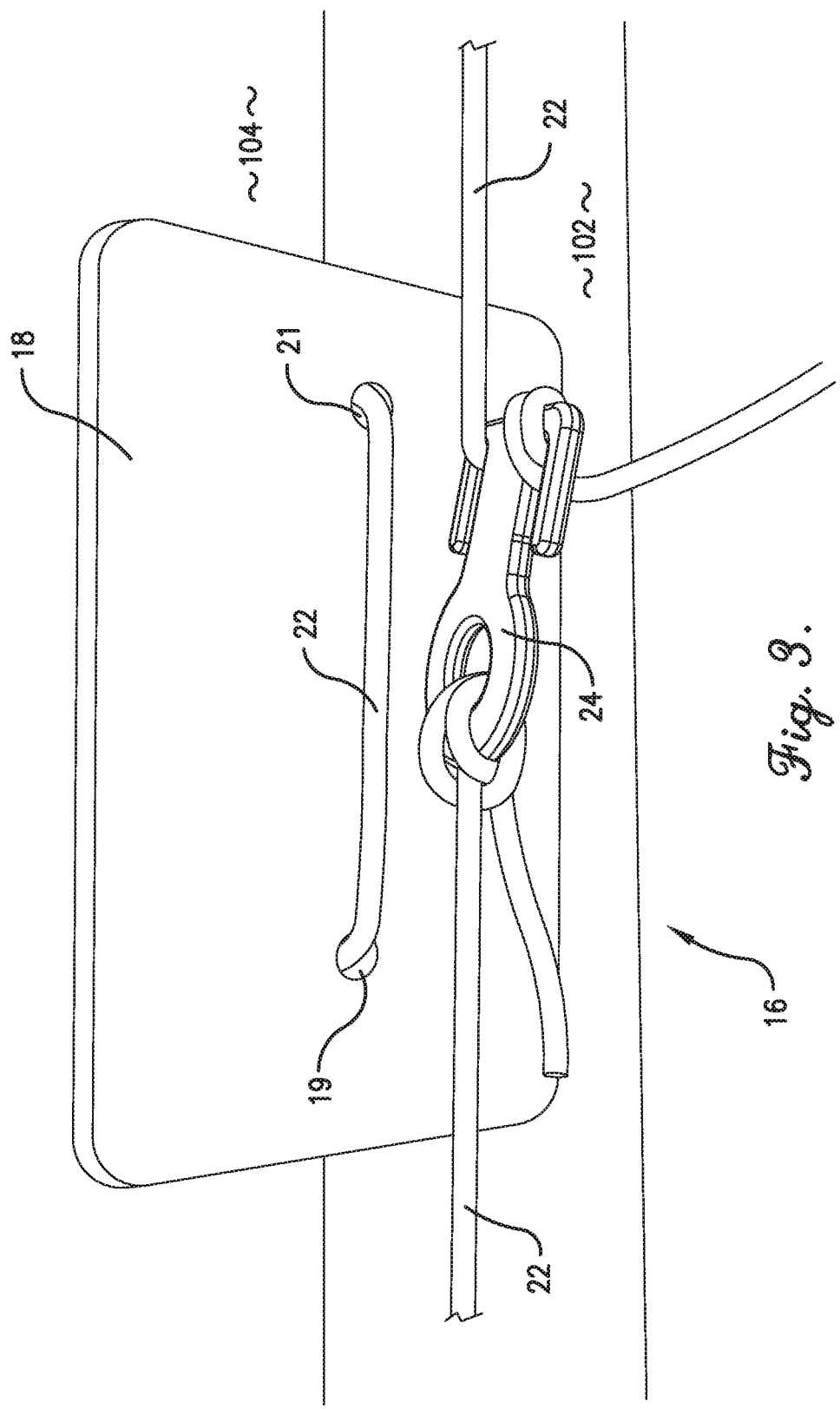
FIG. 3 is another enlarged view of the anchor system.

The anchor 18 is configured to be placed behind the seat 100 and to be urged against the rear of the seat by the first drawstring 22 to prevent the seat bottom overlay 12 and seat back overlay 14 from shifting, bunching up, twisting, or otherwise moving or sliding off the seat 100. An embodiment of the anchor 18 is a flat plate with opposed front and back sides, top and bottom edges, and right and left side edges. The plate may be formed of metal or any other rigid materials, and in one embodiment, is rectangular in shape and between 2-10" wide, 2-5" tall, and 1/16-1/4" thick. As best shown in FIG. 3, a pair of horizontally spaced drawstring holes 19, 21 are formed near the right and left edges of the anchor 18 through which the drawstring 22 is threaded. Alternatively, the anchor 18 may include notches, slots, a groove, a through-channel, rings, a sleeve, or any other suitable geometry or mechanism for coupling with the drawstring 22.

Figure 5:
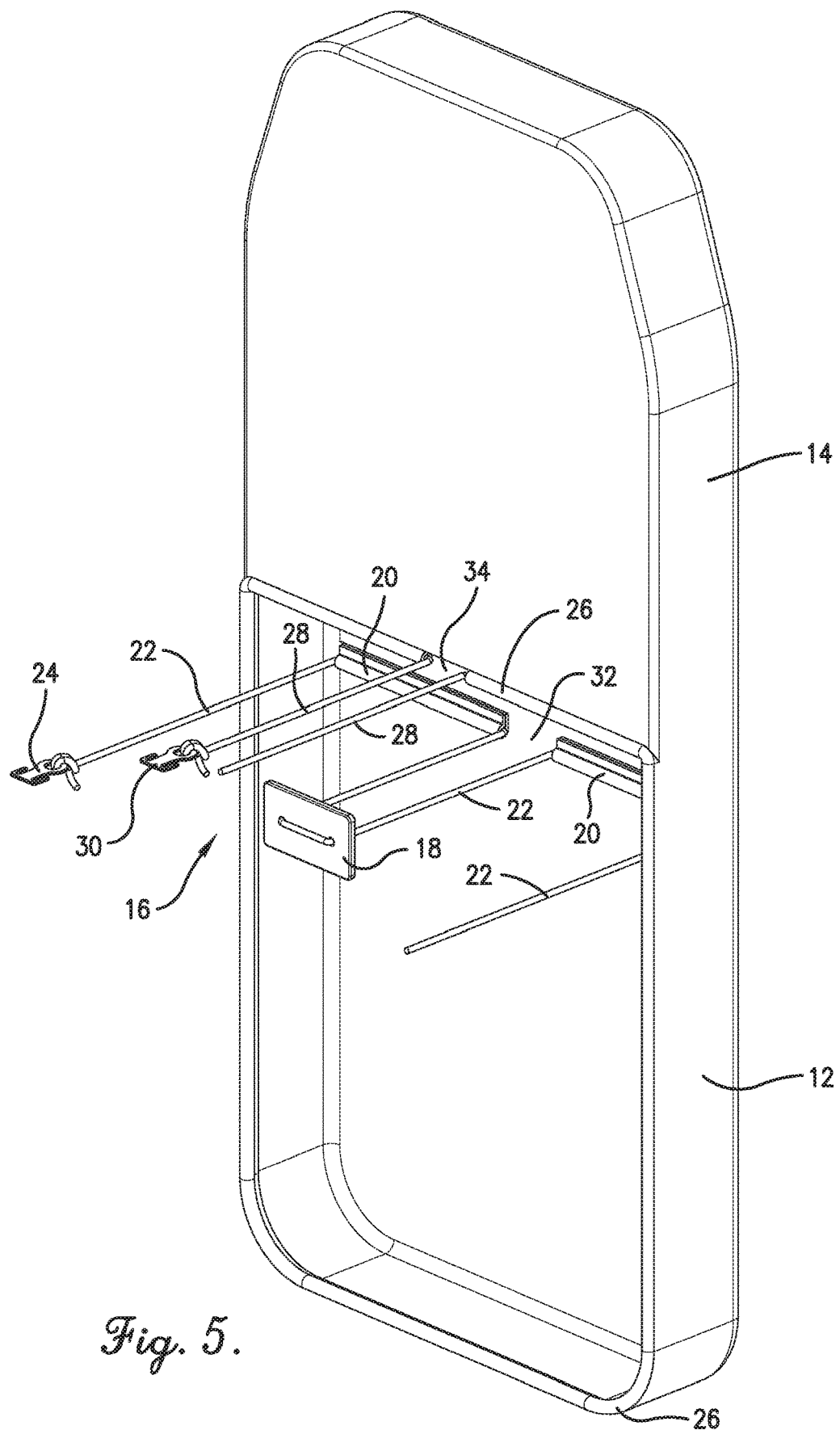
FIG. 5 is a rear perspective view of the seat cover shown without the vehicle seat.

The first drawstring sleeve 20 is formed on the rear side of the seat cover near the intersection of the seat bottom overlay 12 and the seat back overlay 14. As best shown in FIG. 5, an embodiment of the first drawstring sleeve extends horizontally between side margins of the seat cover and includes a central gap 32, the purpose of which is described below. The first drawstring sleeve 20 may be formed with a hollow cloth piping, fabric folds, grommets, a series of loops, or anything else that can receive a drawstring.

The first drawstring 22 is threaded through the holes 19, 21 in the anchor 18 and the first drawstring sleeve 20 via the gap 32 in the sleeve with its loose ends extending out of the outer edges of the drawstring sleeve. The drawstring 22 may be a string, a wire, a cable, a band, a cord, a chain, or the like and may be a closed loop or may be open-ended.

The first drawstring catch 24 is attached to one free end of the first drawstring 22 and retains the first drawstring 22 in a drawn configuration. The catch 24 may be a clip, a latch, a hook, or other suitable drawstring engaging mechanism. For example, the drawstring catch 24 may include barbs, loops, hook-and-loop strips, and other elements for preventing the drawstring 22 from becoming loose. Alternatively, the drawstring catch may be omitted, and the drawstring 22 may be tied in a knot.

The second drawstring sleeve 26 is formed on the perimeter of the rear side of the seat bottom overlay 12. As best shown in FIG. 5, an embodiment of the second drawstring sleeve 26 extends around the rear edge of the seat bottom overlay and includes a central gap 34, the purpose of which is described below. The second drawstring sleeve 26 may be formed with a hollow cloth piping, fabric folds, grommets, a series of loops, or anything else that can receive a drawstring.

The second drawstring 28 is threaded through the second drawstring sleeve 26 via the gap 34 in the sleeve with its loose ends extending out of the gap. The drawstring 28 may be a string, a wire, a cable, a band, a cord, a chain, or the like and may be a closed loop or may be open-ended.

The second drawstring catch 30 is attached to one free end of the second drawstring 28 and retains the second drawstring 28 in a drawn configuration. The catch 30 may be a clip, a latch, a hook, or other suitable drawstring engaging mechanism. For example, the drawstring catch 30 may include barbs, loops, hook-and-loop strips, and other elements for preventing the drawstring 28 from becoming loose. Alternatively, the drawstring catch 30 may be omitted, and the drawstring 28 may be tied in a knot.

Installation and use of the seat cover 10 will now be described in more detail. First, the seat bottom overlay 12 is positioned over the seat bottom 102 so that the seat bottom overlay 12 covers a sitting surface of the seat bottom 102. The seat back overlay 14 is then positioned over the seat back 104 so that the seat back overlay 14 covers a front support surface of the seat back 104.

The anchor 18 is then pushed behind the seat through the gap between the seat button and seat back and positioned such that the back side of the anchor is against the rear of the seat. This step may alternatively be done before the seat overlays are placed over the seat.

The first drawstring 22, which passes through the gap between the seat bottom 102 and seat back 104, through one of the drawstring openings 19, 21 of the anchor 18, along the anchor's back side, back through the other drawstring opening 19, 21, and back through the seat gap, may then be tightened so that it pulls the anchor 18 against the rear of the seat. The first drawstring 22 may then be looped into or passed through the drawstring catch 24 to retain the drawstring 22 in the drawn configuration.

The second drawstring 28 may then be tightened to firmly pull the seat bottom overlay 12 against the seat bottom 102. The drawstring 28 may then be looped into or passed through the second drawstring catch 30 to retain the drawstring 28 in the drawn configuration.

The above-described seat cover 10 provides several advantages. For example, because of its size and configuration, the anchor 18 remains essentially flush with the seat bottom 102 and/or seat back 104 and thus cannot easily slip back between the gap in the seat. Also, because the anchor is formed of rigid material, it won't collapse or become warped or smashed. The drawstring catches 24, 30 are also larger and have no moving parts, making them easier to use and more durable.

Although the invention has been described with reference to the embodiments illustrated in the attached drawing figures, it is noted that equivalents may be employed, and substitutions made herein without departing from the scope of the invention as recited in the claims.

Having thus described various embodiments of the invention, the following includes possible patentable subject matter:

The invention claimed is:

1. A seat cover comprising:
   a seat bottom overlay configured to cover a seat bottom of a seat;
   a seat back overlay configured to cover a seat back of the seat, and
   an anchor system comprising:
      a rigid anchor configured to be positioned behind the seat, the anchor having two spaced-apart drawstring holes;
      a drawstring sleeve on the seat bottom overlay or the seat back overlay; and
      a drawstring passing through the drawstring holes of the anchor and passing through the drawstring sleeve and configured, when tightened, to urge the anchor against a rear of the seat to help hold the seat bottom overlay and seat back overlay in place on the seat.

2. The seat cover as set forth in claim 1, wherein the anchor comprises a flat metal plate.

3. The seat cover as set forth in claim 1, wherein the anchor is rectangular in shape and at least 2 inches wide and 2 inches tall.

4. The seat cover as set forth in claim 1, wherein the seat bottom overlay and seat back overlay are connected.

5. The seat cover as set forth in claim 1, further comprising a drawstring catch for retaining the drawstring in a drawn configuration.

6. The seat cover as set forth in claim 1, wherein the drawstring sleeve is selected from the group consisting of hollow cloth piping, fabric folds, grommets, and a series of loops.

7. A seat cover comprising:
   a cloth seat bottom overlay configured to cover a seat bottom of a seat;
   a cloth seat back overlay configured to cover a seat back of the seat, and
   an anchor system comprising:
      a rigid, flat, metal anchor that is not integrally formed with the cloth seat bottom overlay or the cloth seat back overlay configured to be positioned behind the seat, the anchor having opposed front and back sides and two spaced-apart drawstring holes;
      a drawstring sleeve on a rear side of the seat bottom overlay or the seat back overlay; and
      a drawstring passing through the drawstring holes in the anchor and the drawstring sleeve and configured, when tightened, to urge the back side of the anchor against a rear of the seat to help hold the seat bottom overlay and seat back overlay in place on the seat.

8. The seat cover as set forth in claim 7, wherein the drawstring is made of cloth.

9. The seat cover as set forth in claim 7, wherein the anchor is rectangular in shape and at least 2 inches wide and 2 inches tall.

10. The seat cover as set forth in claim 7, wherein the anchor is 1/16"-1/4" thick.

11. The seat cover as set forth in claim 7, wherein the seat bottom overlay and seat back overlay are connected.

12. The seat cover as set forth in claim 7, further comprising a drawstring catch for retaining the drawstring in a drawn configuration.

13. The seat cover as set forth in claim 7, wherein the drawstring sleeve is selected from the group consisting of hollow cloth piping, fabric folds, grommets, and series of loops.

14. A seat cover comprising:
   a cloth seat bottom overlay configured to cover a seat bottom of a seat;
   a cloth seat back overlay configured to cover a seat back of the seat, and
   an anchor system comprising:
      a rigid, flat, metal anchor that is formed separately from and not integrally attached to the seat bottom overlay or the seat back overlay and configured to be positioned behind the seat, the anchor having opposed front and back sides and two spaced-apart drawstring holes;
      a drawstring sleeve on a rear side of the seat bottom overlay or the seat back overlay; and
      a drawstring passing through the drawstring holes in the anchor and the drawstring sleeve and configured, when tightened, to urge the back side of the anchor against a rear of the seat to help hold the seat bottom overlay and seat back overlay in place on the seat, the anchor being attached to the seat cover only by the drawstring.

15. The seat cover as set forth in claim 14, wherein the anchor is rectangular in shape and at least 2 inches wide and 2 inches tall.

16. The seat cover as set forth in claim 14, wherein the anchor is 1/16" 1/4" thick.

17. The seat cover as set forth in claim 14, wherein the seat bottom overlay and seat back overlay are connected.

18. The seat cover as set forth in claim 14, further comprising a drawstring catch for retaining the drawstring in a drawn configuration.

\* \* \* \* \*